United States Patent [19]

Thornhill et al.

[11] Patent Number: 5,277,795

[45] Date of Patent: Jan. 11, 1994

[54] PROCESS AND APPARATUS FOR RECOVERING HEAVY METAL FROM CARBONACEOUS MATERIAL

[76] Inventors: Denis H. Thornhill, P.O. Box 101, Caracas 1010, Venezuela; William M. Urquhart, 16 Glendee Road, Renfrew, Scotland

[21] Appl. No.: 863,345

[22] Filed: Apr. 1, 1992

Related U.S. Application Data

[63] Continuation of Ser. No. 537,297, Jun. 13, 1990, abandoned.

[30] Foreign Application Priority Data

Jun. 13, 1989 [GB] United Kingdom ............... 8913565

[51] Int. Cl.$^5$ .............................................. C10G 31/00
[52] U.S. Cl. ................................. 208/251 R; 423/62; 423/68; 423/138; 423/658.5; 423/148; 423/150.1
[58] Field of Search ............... 423/62, 68, 138, 658.5, 423/148, 150; 208/251

[56] References Cited

U.S. PATENT DOCUMENTS

| | | | |
|---|---|---|---|
| 2,749,218 | 6/1956 | Heath | 423/148 |
| 3,167,419 | 1/1965 | Wittmann et al. | 423/148 |
| 3,172,755 | 3/1965 | Vian-Ortuno et al. | 423/148 |
| 3,189,437 | 6/1965 | Boucraut | 423/148 |
| 3,910,769 | 10/1975 | Mayer et al. | 423/148 |
| 4,053,301 | 10/1971 | Stephens, Jr. | 423/148 |
| 4,100,251 | 7/1978 | Reinhardt et al. | 423/68 |
| 4,243,639 | 1/1981 | Haas et al. | 423/148 |
| 4,389,378 | 6/1983 | McCorriston | 423/148 |
| 4,443,415 | 4/1984 | Queneau et al. | 423/62 |
| 4,472,360 | 9/1984 | McCorriston et al. | 423/148 |
| 4,534,186 | 9/1985 | Schemel et al. | 423/62 |
| 4,536,374 | 8/1985 | McCorriston | 423/62 |
| 4,645,651 | 2/1987 | Hähn et al. | 423/62 |
| 4,788,044 | 11/1988 | Corigliano et al. | 423/62 |
| 4,798,709 | 1/1989 | Lakshmanan et al. | 423/68 |
| 4,816,236 | 3/1984 | Gardner | 423/68 |

*Primary Examiner*—Helane Myers
*Attorney, Agent, or Firm*—Shlesinger, Arkwright & Garvey

[57] ABSTRACT

Heavy metal compounds, particularly vanadium pentoxide, are recovered from petroleum coke by combusting the coke under conditions constraining the temperatures to within the range 680° C. to 1400° C., collecting the ash which is then subjected to a known process for the extraction of the metallic compounds.

Whilst the combustion process may be achieved in a fluidised bed furnace, higher recovery rates are likely to be achieved utilising a tubular furnace chamber inclined at 10° to horizontal. dried petroleum coke, ground to fine powder (ASTM 75 micron, or less) is entrained into a primary air flow injected tangentially into the chamber through ports together with secondary air sufficient to maintain an oxidising atmosphere. Molten slag is deposted on the chamber wall by centrifugal action and drained from the chamber to fall on a rotating steel drum immersed in a water trough. A scraper removes the slag from the drug as flakes which are removed from the water trough using a screw conveyor.

7 Claims, 1 Drawing Sheet

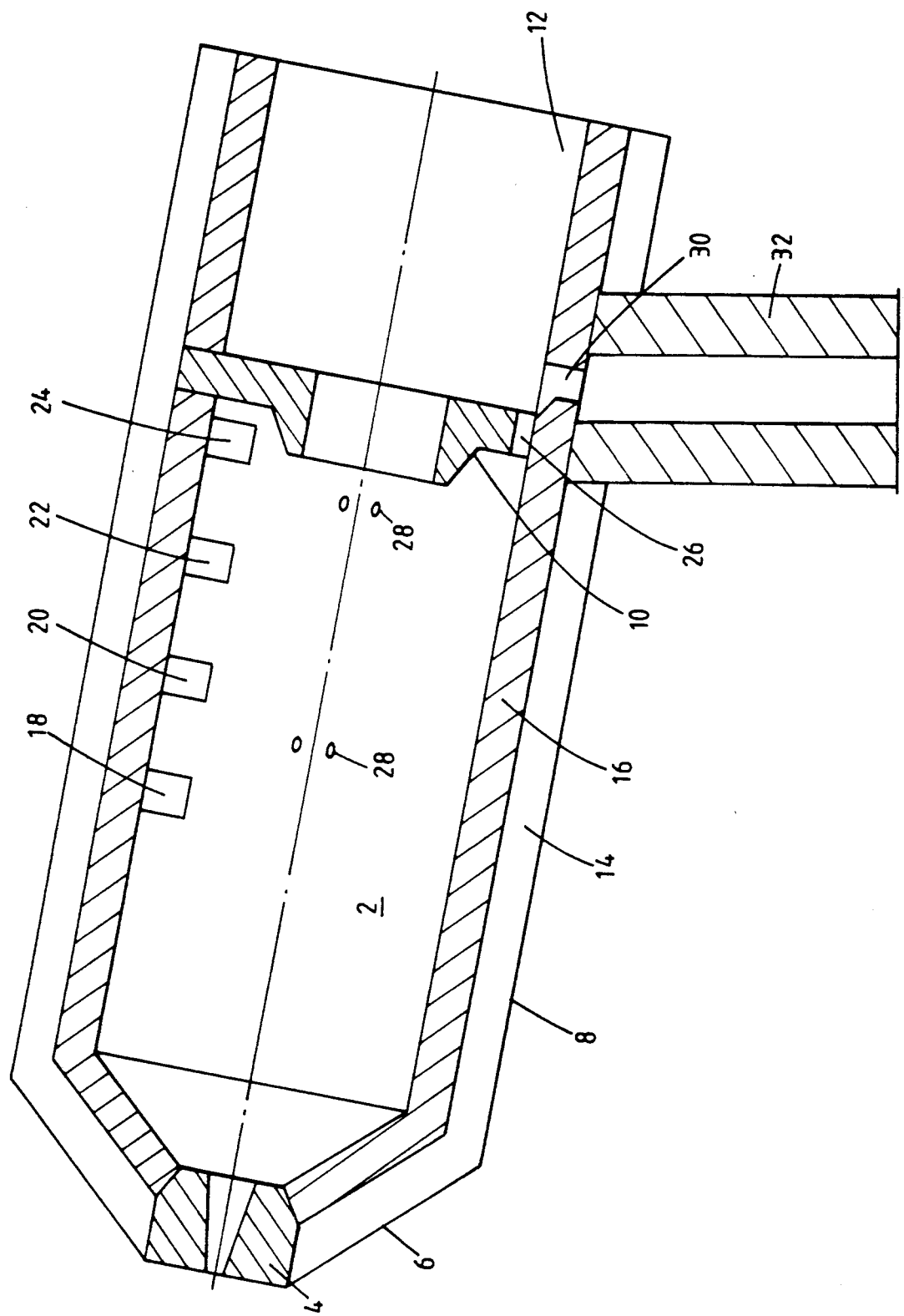

PROCESS AND APPARATUS FOR RECOVERING HEAVY METAL FROM CARBONACEOUS MATERIAL

This application is a continuation of application Ser. No. 07/537,297, filed Jun. 13, 1990 now abandoned.

This invention relates to a process for recovering heavy metal compounds from carbonaceous material, and, more particularly, to a process for recovering vanadium and nickel compounds from petroleum coke.

In recent years a number of new processes have been developed for the refining of crude oil, and also for the further refining of residual oils remaining from primary refining processes, with the object of thus obtaining additional fractions and added value distillates not previously obtainable. These new processes, and particularly those which now convert the residuals from the traditional vacuum distillation processes into new and additional refinery products, also generate significant quantities of sub-products or refining residues commonly known as "petroleum coke", "delayed coke", "flexi-coke" and such like. These sub-products or refining residues vary widely in composition, the principal component invariably being carbon (C) with a secondary content of heavy metallic compounds such as oxides of vanadium (V) and nickel (Ni) varying in accordance with the composition of the petroleum oil being refined and also varying depending on the particular refining processes utilised.

In particular, it has been found that Venezuelan oils of all types have a relatively high, on a worldwide scale, content of both vanadium and nickel, and therefore both the fly-ash produced by burning the oil, for example in boilers supplying electric utilities, and the final petroleum coke residues from refining processes after gasification, are all relatively high in content of vanadium and nickel. The metallic compounds or oxides of such vanadium and nickel are intimately bound with the carbon in the petroleum coke and whilst they can be very effectively separated from the petroleum coke and also one from the other by acid-leaching and selective precipitation, that process is not economically practical for the extraction of vanadium and nickel from any of the various types of vanadium and nickel-bearing petroleum cokes presently being produced. The present invention is concerned with apparatus and a process to burn, oxidise or gasify the carbon content of the fly-ash or petroleum coke, and simultaneously to capture and recover the unburnable or non-volatile elements which constitute the ash. Upon converting the petroleum coke to ash, the metallic compounds form an appreciable proportion of the ash and the known processes for extraction of the metallic compounds may be exercised economically utilising the ash.

According to one aspect of the present invention there is provided a process for recovering heavy metal compounds from carbonaceous material including subjecting the carbonaceous material to pyrolysis in the presence of air combusting the carbon content at temperatures in the range of 600° to 1400° C. collecting the ash resulting from combustion and subjecting the ash to a recovery process to separate the heavy metal compounds from the ash.

The heavy metal compounds may include vanadium and nickel and the carbonaceous material may be carbon contained in residues arising from refining processes for petroleum oils.

Preferably, the carbonaceous material is ground to a grain size to pass through 200 mesh American Standard (ASTM 75 micron). An even finer particle size, that is down to pass through 325 mesh American Standard (ASTM 45 micron) may, with advantage, be utilised.

Desirably, the carbonaceous material is combusted at temperatures in excess of 680° C. whilst upper temperatures of lower than 1200° C. or even 1000° C. are to be preferred.

Suitably, combustion is effected in a furnace of tubular form, having an open end, a closed end and a cylindrical wall, with ports for the carbonaceous material and combustion air arranged to discharge tangentially into the furnace, a combustion gas exit at the open end and a molten ash outlet draining to collection means. An inwardly directed throat may be provided adjacent the open end.

Alternatively, the combustion process is effected in a fluidised bed furnace.

Advantageously, the combustion gases are passed through a gas cleaning apparatus to recover particulate material therein which particulate material is returned to the tubular furnace.

BRIEF DESCRIPTION OF THE FIGURE

The figure depicts a cylindrical Furnace.

In one embodiment of the invention shown in the accompanying, partly diagrammatic, drawing the furnace 2 is of generally cylindrical form having an axis inclined at 10° to the horizontal and including an end plug 4, a frusto-conical portion 6 and a main cylindrical portion 8 provided with a throat 10 and a hot gas exit 12. The portions are formed as a water cooled shell 14 lined with silicon carbide refractory material 16 and are penetrated by tangential feed ports 18, 20, 22, 24—each divided into a radially outer secondary air port and a radially inner port for primary air and flexi-coke, a slag drain hole 26 and radial ports 28 for auxiliary gas firing. A slag outlet 30 leads to an extended, silicon carbide refractory lined, square cross-section, duct 32 discharging to a water trough (not shown) forming a gas seal. The molten slag is arranged to fall on to a steel roller immersed in the water to form thin flakes of solidified slag which are scraped from the rotating roller and removed from the water trough by means of a screw conveyor (not shown) for treatment to extract the vanadium content.

The hot gas exit 12 is arranged to discharge to a chimney (not shown).

In operation, the furnace is fired such as to burn-off as effectively as possible the maximum carbon content of a metallic compound-bearing material such as coal, fly-ash, petroleum coke, flexi-coke, or any similar material, whilst recovering the maximum amount possible of the resulting ash, which will contain a relatively high content of metallic compounds, and constitutes the final product.

The furnace is first pre-heated by injecting and igniting fuel utilising the auxiliary gas burner ports 28 until a temperature not less than six hundred degrees celsius (600° C.) and up to one thousand two hundred degrees celsius (1,200° C.) is achieved. At this point injection of the material to be combusted is commenced. The material should be dry, with a maximum of ten percent (10%) of humidity, and with a grain size of not more than an American Standard 40 mesh (ASTM 420 micron). Grain sizes of less than American Standard mesh 200 (ASTM 75 micron) and, preferably, less than American Standard mesh 325 (ASTM 45 micron) have been found to give enhanced results. The material to be combusted, for example flexi-coke, with a vanadium (V) content of between 2 percent and up to 10 percent is mixed with a quantity of primary air equivalent to approximately 15% of the flexi-coke stochiometric air requirement. This mixture is fed selectively to the furnace through the radially inner ports of the tangential feed-ports 18, 20, 22, 24 with feeding through the ports 20, 24, tending to give best combustion results. Secondary combustion air is discharged through the radially outer ports of the feed ports 18, 20, 22, 24, to provide the required total excess air supply and to produce a strong rotating effect about the furnace axis. The ignited gas fuel-burners and radiant heat from the refractory walls causes the mixture to burn instantly with an extended dwell time in the chamber and flame temperature below 1400° celsius maximum and preferably below 1200° or even 1000° celsius. The centrifugal effect of the rotating flow urges the burning particles outwards so that the burning particles including vanadium pentoxide, with a melting point of approximately 680 degrees celsius, become semi-liquid and commence to adhere to the refractory walls 16 of the furnace, meanwhile the carbon particles continue to burn forming around the particles a protective bubble of carbon dioxide gas ($CO_2$), which inhibits further oxidation or burning. However, the rotating and violent swirling motion of the incandescent mass of particulate material within the furnace, combined with the resulting centrifugal force, produces a "scrubbing" around the interior of the refractory wall, continuously stripping away the combustion-inhibiting carbon dioxide on the walls, thus encouraging access of additional oxygen and the completion of the burning process, of any remaining unburnt carbon adhering to the walls 16 of the furnace.

The convergent effect of the throat 10, which reduces the cross-sectional diameter to approximately 40% of the diameter of the main cylindrical portion 8, produces an increase in rotational velocity of the gases about the central axis along the portion, thereby increasing the centrifugal forces acting on the slag particles and enhancing deposition of the particles on the refractory lining prior to discharge of the hot gas from the furnace as well as increasing the dwell time o the particles in the chamber. However, in some instances, it may be found unnecessary to provide such a convergency and an exit aperture in an end wall may suffice.

The ash, deposited on the interior wall of the furnace at temperatures of approximately 1000 degrees celsius, will flow down the walls of the furnace, assisted by gravitational force, and will drain out of the furnace through the slag drain holes 26 situated at the bottom of the furnace. Exit gases, mainly composed of carbon dioxide gas ($CO_2$), are discharged through a chimney (not shown). Alternatively, if required, the exit gases may be cooled and subjected to extraction of any residual particulate matter by conventional means which include cyclones, electro-static precipitators, wet-scrubbers, fiberglass filters, and/or any other conventional gas-cleaning methods, the particulate matter recovered by such methods being subsequently re-circulated through the furnace for recuperation of the metallic compounds contained in such recuperated material thus enhancing the total recuperation of the metallic compounds by this process.

It will be appreciated that other orientations of the central axis of the furnace chamber may be utilised and, indeed, the furnace chamber may be orientated adjustably in any position from having the central axis extending horizontally to having the central axis extending vertically.

Since vanadium pentoxide ($V_2O_5$) has a melting point of approximately 650 degrees celsius whilst the lower oxides have melting points of approximately 1800 degrees celsius, a sufficient excess of air is required to minimise the formation of the lower oxides. In addition, since vanadium pentoxide is volatile, it is desirable to restrict the temperatures achieved in the furnace as much as possible whilst maintaining combustion. Temperatures of 1000, or up to 1200, degrees celsius have been found to avoid appreciable volatisation of the vanadium pentoxide in the furnace chamber.

It will be appreciated that where recovery of nickel compounds is concerned, different temperature considerations may arise.

We claim:

1. A process for recovering heavy metal compounds of the group comprising vanadium compounds and nickel compounds from carbonaceous material contained in residue arising from refining processes for petroleum oils and containing carbon and said heavy metal compounds, said process consisting essentially of the steps of:
   a) drying the residue containing the carbonaceous material to have a moisture content of less than 10%;
   b) grinding the residue containing the carbonaceous material to have a grain size to pass through 40 mesh American Standard (ASTM 420 micron);
   c) subjecting the ground residue containing the carbonaceous material to pyrolysis, without prior leaching, in the presence of air to combust the carbon content at temperatures in the range of 600° C. to 1400° C.;
   d) performing the pyrolysis in a furnace of tubular form, the furnace having an open end formed with an inwardly directed throat and a closed end, a cylindrical wall with burner ports and combustion air and feed ports arranged to discharge tangentially into the furnace, a combustion gas exit at the open end and a molten ash outlet draining to collection means;
   e) collecting the molten ash resulting from combustion;
   f) allowing the molten ash to solidify; and
   g) subjecting the ash to a recovery process to separate the heavy metal compounds from the ash.

2. A process as in claim 1, wherein the residue is combusted at temperatures in excess of 680° C.

3. A process as in claim 1, wherein the residue is ground to have a grain size to pass through 200 mesh American Standard (ASTM 75 micron).

4. A process as in claim 1, wherein the residue is ground to have a grain size to pass through 325 mesh American Standard (ASTM 45 micron).

5. A process as in claim 1, wherein the tubular furnace is arranged with its major longitudinal axis extending at an inclination of 10° to the horizontal.

6. A process as in claim 1, wherein the combustion gases are passed through a gas cleaning apparatus to recover particulate material therein, which particulate material is returned to the furnace.

7. A process for preparing carbonaceous-material-containing residue arising from refining processes for petroleum oils and containing carbon and heavy metal compounds of the group comprising vanadium compounds and nickel compounds for the recovery of said heavy metal compounds, said process consisting essentially of the steps of;

a) drying the carbonaceous-material-containing residue to have a moisture content of less than 10%;

b) grinding the carbonaceous-material-containing residue to have a grain size to pass through 40 mesh American Standard (ASTM 420 micron);

c) subjecting the ground carbonaceous-material-containing residue to pyrolysis, without prior leaching, in the presence of air to combust the carbon content at temperatures in the range of 600° C. to 1400° C.;

d) performing the pyrolysis in a furnace of tubular form, the furnace having an open end formed with an inwardly directed throat and a closed end, a cylindrical wall with burner ports and combustion air and feed ports arranged to discharge tangentially into the furnace, a combustion gas exit at the open end and a molten ash outlet draining to collection means;

e) collecting the molten ash resulting from combustion; and f) allowing the molten ash to solidify preparatory to subjecting the ash to a recovery process to separate the heavy metal compounds from the ash.

* * * * *